(12) United States Patent
Vacus et al.

(10) Patent No.: US 8,274,428 B2
(45) Date of Patent: Sep. 25, 2012

(54) METHOD FOR ESTIMATING A RADAR CROSS-SECTION

(75) Inventors: Olivier Vacus, Cestas (FR); Sylvain Morvan, Saint Medard en Jalles (FR)

(73) Assignee: Commissariat a l'Energie Atomique, Paris (FR)

( * ) Notice: Subject to any disclaimer, the term of this patent is extended or adjusted under 35 U.S.C. 154(b) by 254 days.

(21) Appl. No.: 12/593,274

(22) PCT Filed: Apr. 3, 2008

(86) PCT No.: PCT/EP2008/054026
§ 371 (c)(1),
(2), (4) Date: Sep. 25, 2009

(87) PCT Pub. No.: WO2008/122569
PCT Pub. Date: Oct. 16, 2008

(65) Prior Publication Data
US 2010/0109941 A1   May 6, 2010

(30) Foreign Application Priority Data

Apr. 3, 2007 (FR) .................................. 07 54251

(51) Int. Cl.
*G01S 7/40* (2006.01)
*G01S 7/00* (2006.01)
*G01S 13/00* (2006.01)
(52) U.S. Cl. .......... 342/173; 342/89; 342/165; 342/175; 342/188; 342/195
(58) Field of Classification Search ............. 342/89–93, 342/165–175, 195, 188
See application file for complete search history.

(56) References Cited

U.S. PATENT DOCUMENTS

| 5,534,873 | A  | * | 7/1996  | Weichman et al. | 342/165 |
| 5,703,592 | A  | * | 12/1997 | Watts | 342/93 |
| 6,008,753 | A  | * | 12/1999 | Berg et al. | 342/165 |
| 6,522,284 | B2 | * | 2/2003  | Miceli et al. | 342/195 |
| 6,529,157 | B1 | * | 3/2003  | Mensa et al. | 342/173 |
| 6,756,935 | B1 |   | 6/2004  | Cameron et al. | |

OTHER PUBLICATIONS

William L. Cameron, et al., "Simulated Polarimetric Signatures of Primitive Geometrical Shapes," IEEE Transactions on GeoScience and Remote Sensing, May 1996, vol. 34, No. 3, IEEE Service Center, Piscataway, NJ.
Shane Robert Cloude, et al., "A Review of Target Decomposition Theorems in Radar Polarimetry," IEEE Transactions on GeoScience and Remote Sensing, Mar. 1996, vol. 34, No. 2, IEEE Service Center, Piscataway, NJ.
Mark A. Sletten, et al., "Radar Polarimetry," Wiley Encyclopedia of Electrical and Electronics Engineering, Dec. 27, 1999, pp. 1-15.
J. Richard Huynen, "Measurement of the Target Scattering Matix", Proceedings of the IEEE, Aug. 1965, pp. 936-946, vol. 53, No. 8.

(Continued)

*Primary Examiner* — Bernarr Gregory
(74) *Attorney, Agent, or Firm* — Nixon Peabody LLP (57) ABSTRACT

A method for estimating a radar cross-section (RES) of a given object by using a diffraction model of this object. With the model, it is possible to determine a basis adapted to said object on which is projected a vector of measurement. With the projected vector, it is possible to obtain a more complete reconstructed vector than the measurement vector in terms of incident wave and diffracted wave observation directions/polarizations and the components of which have a better signal/noise ratio than the measurements. The reconstructed vector is then used for calculating the RCS.

16 Claims, 6 Drawing Sheets

OTHER PUBLICATIONS

Roger F. Harrington, et al., "Theory of Characteristic Modes for Conducting Bodies", IEEE Transactions on Antennas and Propagation, Sep. 1971, pp. 622-628, vol. AP-19, No. 5.

G.T. Ruck, et al, "Radar Cross-Section Handbook", vols. 1 & 2, Reprint published by Peninsula Publishing in May 2002, First published in 1970.

* cited by examiner

METHOD FOR ESTIMATING A RADAR CROSS-SECTION

CROSS REFERENCE TO RELATED APPLICATIONS OR PRIORITY CLAIM

This application is a national phase of International Application No. PCT/EP2008/054026, entitled "METHOD OF ESTIMATION OF EQUIVALENT RADAR SURFACE", which was filed on Apr. 3, 2008, and which claims priority of French Patent Application No. 07 54251, filed Apr. 3, 2007.

DESCRIPTION

1. Technical Field

The present invention relates to the field of radar signature and more particularly to the determination of a radar cross-section.

2. State of the Prior Art

The radar cross-section or RCS is a fundamental quantity characteristic of a target. It is used both in the military field and in the civil field (for example air control) with the purposes of discriminating an object, typically an aircraft.

The RCS of a radar target is conventionally defined from assessment of the power of the wave emitted towards the target and of the power of the wave received by the radar. In the far field and by approximating the waves to plane waves, the radar equation is actually written as:

$$P_r = P_e G_e \frac{1}{4\pi d^2} \sigma \frac{1}{4\pi d^2} G_r \frac{\lambda^2}{4\pi} \quad (1)$$

wherein $P_e$ and $P_r$ respectively are the powers of the waves emitted and received by the radar, $G_e$ and $G_r$ are the antenna gains upon emission and reception, d is the distance between the radar and the target, $\lambda$ is the wavelength used by the radar. The coefficient $\sigma$ is homogeneous to a surface area and only depends on the relevant target, this is the RCS of the target.

A more detailed description of the RCS will notably be found in the textbook of G. T. Tuck et al. entitled <<Radar Cross-section Handbook>> published by Peninsula Publishing.

In the expression (1), it is assumed that the radar being used for illuminating the target is the same as the one being used for receiving the diffracted wave, one then speaks of monostatic RCS. As a general rule, the monostatic RCS depends on the direction of the incident wave, on the frequency f of the radar and on the respective polarizations $\pi_e$ and $\pi_r$, with which the incident wave is emitted and the received wave is analyzed. It is noted as $RES(f, \phi, \theta, \pi_e, \pi_r)$, wherein $(\phi, \theta)$ are the relative bearing and roll angles of the radar in a reference system bound to the target. Each of the polarizations $\pi_e$ and $\pi_r$, may be horizontal or vertical, i.e. $\pi_e$=H or V; $\pi_r$=H or V.

Similarly, if the radar system is bistatic, i.e. if the radar used for analyzing the diffracted wave is distinct from the one which is used for illuminating the target, one speaks of bistatic RCS. The latter does not only then depend on the direction of the incident wave, but also on the direction of the diffracted wave. It is noted as wherein $(\theta_e, \phi_e)$, respectively $(\theta_r, \phi_r)$, are the relative bearing and roll angles of the incident wave, of the diffracted wave, respectively.

For estimating the RCS of an object, three frequency zones are generally distinguished:

- a low frequency zone (LF), also called a Rayleigh zone, in which RCS varies as $1/f^4$. In this zone, the wavelength is larger or even much larger than the characteristic dimensions of the object;
- a resonance zone for which the RCS is maximum;
- a high frequency (HF) zone wherein RCS has an asymptotic behavior. This zone corresponds to substantially smaller wavelengths than the characteristic dimensions of the object.

The RCS of an object may be measured or else estimated by simulation.

The measurement of an RCS is conducted in an anechoic chamber, i.e. in a chamber, the walls of which are cladded with absorbents, so as to avoid parasitic echoes. The target is positioned by means of a slightly echogenic positioner, generally on a vertical polystyrene column orientable around its own axis. The measurement is conducted, either by means of a single antenna or by means of two distinct antennas slightly shifted angularly relatively to each other. Depending on the case, monostatic RCS or quasi-monostatic RCS values are obtained for one relative bearing angle or a plurality thereof. The emission antenna should be selected so as to generate a wave as plane as possible.

Obtaining the RCS by a measurement has many limitations.

First of all, it is very expensive to build an anechoic chamber for objects of large sizes. This problem is further worsened at low frequency where the efficiency of the absorbents is less. The conducted measurements are generally affected by noises from miscellaneous sources (parasitic echoes, instrumentation noise, etc.).

Further in the low frequency range, the illumination antenna should be of a large size so as to be able to generate approximately plane waves. Finally, only a few measurements of RCS values are generally carried out typically according to a few relative bearing angles in an equatorial plane, so that only a rather meagre two-dimensional representation of the target is available. Obtaining a three-dimensional RCS by measurements is very seldom and quite often impossible.

Further, by using a system of distinct emission and receiving antennas often required in the low frequency range, it is not possible to obtain an exact estimation of the monostatic RCS.

Instead of conducting these measurements, it is possible in certain cases to estimate the RCS by simulation, notably by means of the method of so-called bright points. According to this method, the target is broken down into a set of independent elementary contributors (or bright points), a weighting coefficient being assigned to each contributor. In other words, the diffracted wave is then considered as the sum of a plurality of spherical waves, each spherical wave being emitted by a bright point. The RCS of the target may then be expressed as:

$$\sigma = \left| \sum_{n=1}^{N} a_n e^{i\vec{k}\cdot\vec{u}_n} \right| \quad (2)$$

wherein the $a_n$, n=1, ..., N are the complex weighting coefficients of the different contributors, $\vec{u}_n$ are vectors giving their respective positions and $\vec{k}$ is the wave vector of the diffracted wave.

The bright point method however proves to be difficult to apply for complex target shapes and whatever the case, does not allow determination of the RCS at a low frequency.

The object of the invention is to propose a method for estimating RCS which does not have the aforementioned drawbacks, i.e., which i.a. allows a RCS to be obtained which is more complete and closer to the actual RCS of the target, including at low frequency.

DISCUSSION OF THE INVENTION

The present invention is defined as a method for estimating a radar cross-section of a given object by means of a diffraction model of said object, said model may be represented by a matrix ($A_b$) of ratios of diffracted wave and incident wave complex amplitudes, for a first plurality ($4N^2$) of pairs of respective incident wave and diffracted wave observation directions and polarizations. According to said method, modal decomposition of said matrix is carried out and the most significant modal vectors are selected from said thereby diagonalized matrix;

a second plurality ($N^\mu$) of measurements of ratios of diffracted wave and incident wave complex amplitudes is carried out for a plurality of pairs of directions and at least one pair of respective incident wave and diffracted wave observation polarizations;

the vector ($a^\mu$), formed by the thereby measured ratios, is projected on said most significant modal vectors;

from the thereby projected vector and from the most significant modal vectors, a reconstructed vector (ã) is generated, the components of which are representative of the ratios of incident and diffracted wave complex amplitudes for said first plurality of pairs of directions and polarizations;

the radar cross-section is determined from at least one component of the reconstructed vector.

According to a first alternative, said modal decomposition is a diagonalization and the modal vectors/modal values are respectively the eigenvectors/eigenvalues of said matrix, respectively.

According to a second alternative, said modal decomposition is a decomposition into singular values and the modal vectors/modal values are the singular vectors/singular values of said matrix, respectively.

According to a first embodiment, a modal vector $v_{k'}$ is selected as being part of the most significant ones if:

$$\frac{\lambda_{k'}^2 \|v_{k'}\|^2}{\left\|\sum_{k=1}^{2N} \lambda_k v_k\right\|^2} > \tau_1$$

wherein $\lambda_k$, $v_k$, $k=1, \ldots, 2N$, are the modal values and modal vectors of the matrix of the model, respectively, 2N is the number of columns of this matrix and $\tau_1$ is a predetermined threshold value.

According to a second embodiment, a model vector $V_{k'}$ is selected as being part of the most significant ones if:

$$\frac{\left\|\sum_{\substack{k=1 \\ k \neq k'}}^{2N} \lambda_k v_k\right\|^2}{\left\|\sum_{k=1}^{2N} \lambda_k v_k\right\|^2} < \tau_2$$

wherein $\lambda_k$, $v_k$, $k=1, \ldots, 2N$ are the modal values and the modal vectors of the matrix of the model, respectively, 2N is the number of columns of the matrix, and $\tau_2$ is a predetermined threshold value.

Advantageously, the projection of the vector formed by the thereby measured ratios, $a^\mu$, is determined by:

$$\lambda^\mu = (V^\mu)^+ a^\mu$$

wherein $\lambda^\mu$ represents the vector of components $a^\mu$ on the most significant modal vectors, $(V^\mu)^+$ is the pseudo-inverse matrix of $V^\mu$, $V^\mu$ is the matrix, the columns of which are said most significant modal vectors and the lines of which correspond to the second plurality of measured ratios.

The reconstructed vector, ã, may be obtained by:

$$\tilde{a} = V^s \lambda^\mu$$

wherein $V^s$ is the matrix, the columns of which are said most significant modal vectors, and the lines of which correspond to the first plurality of ratios of the model.

The radar cross-section ($\tilde{\sigma}_{ij}^{\pi_e \pi_r}$) for a pair of incident wave and diffracted wave observation directions and a pair of associated polarizations is then obtained from the squared modulus ($|\tilde{a}_{ij}^{\pi_e \pi_r}|^2$) of a component of said reconstructed vector.

Advantageously, the pseudo-inverse matrix is obtained by $(V^\mu)^+ = (V^{\mu H} V^\mu)^{-1} V^{\mu H}$, the matrix $V^\mu$ having previously been subject to matrix reconditioning if the conditioning number of the matrix $V^{\mu H} V^\mu$ is larger than a predetermined threshold ($\text{cond}_T$).

Matrix reconditioning of $V^\mu$ preferably comprises steps for suppressing at least one column vector from $V^\mu$ corresponding to the least significant mode, and for substituting the corresponding component of $\lambda^\mu$ with the corresponding modal value.

Said matrix reconditioning steps may be iterated as long as the number of modes (s) remains larger than a predetermined minimum number of modes.

Alternatively, the matrix reconditioning of $V^\mu$ comprises steps for augmenting the vector formed with the measured ratios by at least one simulation datum for a pair of incident wave and diffracted wave observation directions ($\vec{u}_e, \vec{u}_r$) and for a pair of associated polarizations ($\pi_e, \pi_r$) and for augmenting the matrix $V^\mu$ by the corresponding line of $V^s$.

In the latter case, the matrix reconditioning steps may also be iterated as long as the number of introduced simulation data remains less than a predetermined maximum number ($\delta N_{max}$).

The matrix reconditioning of $V^\mu$ may further comprise steps for augmenting the vector formed with the measured ratios by at least one additional measurement for a pair of incident wave and diffracted wave observation directions ($\vec{u}_e, \vec{u}_r$) and for a pair of associated polarization ($\pi_e, \pi_r$) and for augmenting the matrix $V^\mu$ by the corresponding line of $V^s$.

Advantageously, for the additional measurement, the pair of incident wave and diffracted wave observation directions ($\vec{u}_e, \vec{u}_r$) as well as the pair of associated polarizations ($\pi_e, \pi_r$) may be selected so as to minimize the conditioning number of the matrix $V^{\mu H} V^\mu$ after augmenting $V^\mu$.

The invention finally also relates to a computer program comprising software means suitable for carrying out the steps of the estimation method set out above, when it is executed by a computer.

BRIEF DESCRIPTION OF THE DRAWINGS

Other characteristics and advantages of the invention will become apparent upon reading a preferential embodiment of the invention made with reference to the appended figures wherein.

DETAILED DISCUSSION OF PARTICULAR EMBODIMENTS

A target will be considered subsequently, for which it is desired to estimate the monostatic or bistatic RCS, preferentially but not exclusively, at low frequency, in the sense as defined above.

Generally, for a given frequency f, the description of the bistatic RCS of the target may be expressed as a matrix with a size 2N×2N:

$$\Sigma_b = \begin{pmatrix} \sigma_{11}^{HH} & \sigma_{12}^{HH} & \cdots & \sigma_{1N}^{HH} & \sigma_{11}^{HV} & \sigma_{12}^{HV} & \cdots & \sigma_{1N}^{HV} \\ \sigma_{21}^{HH} & \sigma_{22}^{HH} & \cdots & \sigma_{2N}^{HH} & \sigma_{21}^{HV} & \sigma_{22}^{HV} & \cdots & \sigma_{2N}^{HV} \\ \vdots & \vdots & \ddots & \vdots & \vdots & \vdots & \ddots & \vdots \\ \sigma_{N1}^{HH} & \sigma_{N2}^{HH} & \cdots & \sigma_{NN}^{HH} & \sigma_{N1}^{HV} & \sigma_{N2}^{HV} & \cdots & \sigma_{NN}^{HV} \\ \sigma_{11}^{VH} & \sigma_{12}^{VH} & \cdots & \sigma_{1N}^{VH} & \sigma_{11}^{VV} & \sigma_{12}^{VV} & \cdots & \sigma_{1N}^{VV} \\ \sigma_{21}^{VH} & \sigma_{22}^{VH} & \cdots & \sigma_{2N}^{VH} & \sigma_{21}^{VV} & \sigma_{22}^{VV} & \cdots & \sigma_{2N}^{VV} \\ \vdots & \vdots & \ddots & \vdots & \vdots & \vdots & \ddots & \vdots \\ \sigma_{N1}^{VH} & \sigma_{N2}^{VH} & \cdots & \sigma_{NN}^{VH} & \sigma_{N1}^{VV} & \sigma_{N2}^{VV} & \cdots & \sigma_{NN}^{VV} \end{pmatrix} \quad (3)$$

wherein each element $\sigma_{ij}^{\pi_e \pi_r}$ is the value of the observed RCS for an incident wave of direction $\vec{u}_i^e$, of polarization $\pi_e = H$ or V and for a receiving direction $\vec{u}_j^r$ with polarization $\pi_r = H$ or V. The directions $\vec{u}_i^e$ and $\vec{u}_j^r$, i, j=1, ..., N are advantageously but not necessarily equidistributed within the solid angle $4\pi$. For example, these directions may be angularly equidistributed in relative bearing and roll. It will be understood that the higher N, the more the description of the RCS will be accurate. Advantageously, N will be selected so that the sampling according to the relative bearing angle and the roll angle meets the Nyquist criterion.

The matrix $\Sigma_b$ may further be expressed in a more compact form:

$$\Sigma_b = \begin{pmatrix} \sigma^{HH} & \sigma^{HV} \\ \sigma^{VH} & \sigma^{VV} \end{pmatrix} \quad (4)$$

wherein $\sigma^{HH}$, $\sigma^{VH}$, $\sigma^{HV}$, $\sigma^{VV}$ are RCS sub-matrices with a size N×N associated with the different emission and reception polarizations. Because of the propagation reciprocity, these sub-matrices are symmetrical.

Similarly, the complete description of the monostatic RCS may be expressed as a matrix:

$$\Sigma_m = \begin{pmatrix} \text{Diag}(\sigma^{HH}) & \text{Diag}(\sigma^{HV}) \\ \text{Diag}(\sigma^{VH}) & \text{Diag}(\sigma^{VV}) \end{pmatrix} \quad (5)$$

wherein Diag(•) is a linear operator which transforms any matrix $\Omega$ of size N×N into a diagonal matrix of the same size, Diag($\Omega$), having the same diagonal elements as $\Omega$.

The matrices $\Sigma_b$ and $\Sigma_m$ have positive real values. Diffraction matrices $A_b$ and $A_m$ with complex values for which the elements are not power ratios but ratios of complex amplitudes of the received wave and of the incident wave are introduced, in other words, $A_b = \underline{j} = (a_{ij}^{\pi_e \pi_r})$, i, j, ..., N, $\pi_e = H$ or V, $\pi_r = H$ or V with $a_{ij}^{\pi_e \pi_r} = \sqrt{\sigma_{ij}^{\pi_e \pi_r}} \exp(i\psi_{ij}^{\pi_e \pi_r})$ to within a multiplicative coefficient, wherein $\psi_{ij}^{\pi_e \pi_r}$ expresses the phase shift undergone by the diffractive wave relatively to the incident wave.

It may be shown that if the surface of the target is perfectly conducting, the matrix $A_b$ is diagonalizable. This property is due to the fact that the diffraction operator is itself diagonalizable in a basis of characteristic far fields. By diffraction operator is meant the function defined on the space of integrable squared functions $L^2(R^3)$ which associates with the far field of an incoming wave, the far field of the corresponding outgoing wave. Each characteristic far field is due to the radiation of a current distribution at the surface of the object, designated as a characteristic current. A theory of characteristic currents will be found in the article of R. F. Harrington and J. R. Mautz entitled <<Theory of characteristic modes for conducting bodies>> published in IEEE Trans. on Antennas and Propagation, Vol. AP-19, No. 5, 1971.

The RCS estimation method according to the invention starts with a matrix $A_b$ as complete as possible, i.e. for which as many elements $a_{ij}^{\pi_e \pi_r}$ as possible are known, both in terms of emission $\vec{u}_e$ and reception $\vec{u}_r$ directions and in terms of polarizations $\pi_e$, $\pi_r$. This matrix may be obtained with more or less accuracy and for a more or less great number of elements, either by calculation by means of modelling of the object if its shape is not too complex, or by a campaign of measurements carried out on a model of the object at a reduced scale. The matrix $A_b$ represents a diffraction model of the object.

When it is diagonalizable, the matrix $A_b$ may be written as:

$$A_b = WDW^{-1} \quad (6)$$

wherein $D = \text{diag}(\lambda_1, \ldots, \lambda_{2N})$ is the diagonal matrix having as elements the eigenvalues $\lambda_1, \ldots, \lambda_{2N}$ of $A_b$ and wherein W is the basis transformation matrix.

The matrix $A_b$ may be expressed by means of the modal decomposition:

$$A_b = \sum_{k=1}^{2N} \lambda_k V_k \text{ with } V_k = WI_k W^{-1} \quad (7)$$

wherein $I_k$ is a matrix of size 2N×2N, everywhere zero except for the $k^{th}$ of its diagonal equal to 1.

If the surface of the target is not perfectly conducting but simply dielectric, the matrix $A_b$ is no longer diagonalizable. It may however be subject to a decomposition into singular values:

$$A_b = UDV^H \quad (6')$$

wherein $D = \text{diag}(\lambda_1, \ldots, \lambda_{2N})$ is the diagonal matrix having as elements the singular values $\lambda_1, \ldots, \lambda_{2N}$ of $A_b$, U and V are unit matrices and $V^H$ is the conjugate transpose of V. The matrix $A_b$ may then be written as, similarly to (7):

$$A_b = \sum_{k=1}^{2N} \lambda_k V_k \text{ with } V_k = UI_k V^H \quad (7')$$

Subsequently, we shall refer to the eigenvalues or to the singular values under the more general expression of the modal values.

In both cases, if the vector $a_b$ of size $4N^2$ is defined as the concatenation of the 2N column vectors of matrix $A_b$ and, similarly, the vector $v_k$ is defined as the concatenation of the column vectors of matrix $V_k$, the relationship (7) is written as a vector expression:

$$a_b = \sum_{k=1}^{2N} \lambda_k v_k \tag{8}$$

or further if the vector having as components the modal values is noted as $\lambda$ and the matrix of size $2N \times 2N$, the columns which are formed by the vectors $v_k$ is noted as V, respectively:

$$a_b = V\lambda \tag{9}$$

Each of the vectors $v_k$ corresponds to the excitation of a characteristic current and therefore to the generation of a characteristic wave. Advantageously, only the most significant modes, i.e. those the most energetic modes, are selected. To do this, only the modes k' may be retained, those which meet the criterion:

$$\frac{\lambda_{k'}^2 \|v_{k'}\|^2}{\left\|\sum_{k=1}^{2N} \lambda_k v_k\right\|^2} > \tau_1 \tag{10}$$

wherein $\tau_1$ is a predetermined threshold value. Alternatively the selection may be made from the criterion:

$$\frac{\left\|\sum_{\substack{k=1 \\ k \neq k'}}^{2N} \lambda_k v_k\right\|^2}{\left\|\sum_{k=1}^{2N} \lambda_k v_k\right\|^2} < \tau_2 \tag{11}$$

It is clear for one skilled in the art that other criteria may also be used without having to depart from the scope of the invention. In particular, this criterion may use a norm other than the Euclidean norm.

The threshold ($\tau_1$, $\tau_2$) may be adaptive. It results from a compromise between the complexity of the algorithm and of the accuracy of the sought estimation.

After selecting the most energetic modes, the expression (8) amounts to:

$$\tilde{a}_b = \sum_{k \in S} \lambda_k v_k \tag{12}$$

wherein S is the set of selected modes. Equivalently, this amounts to reducing the dimensionality of $\lambda$ and of V:

$$\tilde{a}_b = V^s \lambda^s \tag{13}$$

wherein the vector $\lambda^s$ is obtained by removing from $\lambda$ the non-selected components and, similarly, the matrix $V^s$ is obtained from V by removing the non-selected column vectors. $V^s$ is a matrix of size $4N^2 \times s$ where $s = \text{Card}(S)$ is the number of selected modes.

A simplified diffraction model is thereby obtained but it is nevertheless relevant to the object. The vectors $v_k$, $k \in S$, i.e. the column vectors of $V^s$, generate a space $E^s$, a sub-space of the $E_{2N}$ space generated by the vectors $v_k$, $k = 1, \ldots, 2N$.

The vector of the ratios of the complex amplitudes of the diffracted wave and of the incident wave as measured is noted as $a^\mu$. This vector is generally very lacunary as compared with $\tilde{a}_b$: only certain directions and certain polarizations will have generally been subject to measurement. For example, the elements corresponding to the monostatic configuration may be missing. The number of measurements will be noted as $N^\mu$, with $N^\mu \ll 4N^2$ but $N^\mu \geq s$, and $V^\mu$ is the matrix obtained from $V^s$ by removing the lines for which a measurement is not available. $a^\mu$ is therefore a vector of size $N^\mu$ and $V^\mu$ a matrix of size $N^\mu \times s$.

According to the principle of the invention, the vector $a^\mu$ is projected on the sub-space $E^s$, which amounts to calculating the vector:

$$\lambda^\mu = (V^\mu)^+ a^\mu \tag{14}$$

where the pseudo-inverse matrix of $V^\mu$ and $V^{\mu H}$, the conjugate transpose matrix of $V^\mu$ has been noted as $(V^\mu)^+ = (V^{\mu H} V^\mu)^{-1} V^{\mu H}$. The pseudo-inverse matrix may for example be obtained by means of a decomposition of $V^\mu$ into singular values. The deviation between the components of $\lambda^\mu$ and the theoretical eigenvalues is due to the measurement noise, broadly speaking (parasitic echoes, couplings, noise at the instrumentation level, etc.) on the one hand, and to the differences between the model and the measured actual object on the other hand. It will be understood that only the measurement noise projected on the space $E^s$ has an effect on this deviation. The projection on $E^s$ may be considered as filtering matched to the diffraction model of the object, by which the signal-to-noise ratio of the conducted measurements may be increased.

If a reconstructed vector $\tilde{a}$ is now defined by:

$$\tilde{a} = V^s \lambda^\mu \tag{15}$$

$\tilde{a}$ is a vector of size $4N^2$ which corresponds to a matrix $\tilde{A} = (\tilde{a}_{ij}^{\pi_e \pi_r})$, $i, j = 1, \ldots, N$ of size $2N \times 2N$, the column vectors of which respectively are the 2N blocks of 2N successive components of $\tilde{a}$. In other words, the matrix $\tilde{A}$ is obtained from $\tilde{a}$, in the same way as $A_b$ is obtained from $a_b$. The RCS $\tilde{\Sigma}$ is finally defined by its components $\tilde{\sigma}_{ij}^{\pi_e \pi_r} = |\tilde{a}_{ij}^{\pi_e \pi_r}|^2$, $i, j = 1, \ldots, 2N$, $\pi_e = H$ or V, $\pi_r = H$ or V.

The method exposed above may possibly be iterated, the matrix $\tilde{A}$ then being used as a new model $A_b$. The model is thus gradually corrected during the iterations in order to make it more compliant with the actually measured object.

The filtering and reconstructing operation having $a^\mu$ correspond to $\tilde{a}$ has a triple benefit:

On the one hand, it is possible to obtain RCS values ($\tilde{\sigma}_{ij}^{\pi_e \pi_r}$) for pairs of directions ($\vec{u}_e, \vec{u}_r$) and/or pairs of non-measured polarizations ($\pi_e, \pi_r$). Thus, from a relatively small number of measurements, an estimation of the complete bistatic RCS $\tilde{\Sigma}$ of the object may be obtained by this extrapolation. This is due to the fact that the vectors $v_k$, $k \in S$ form a basis adapted for determining RCS.

On the other hand, even for a pair of directions ($\vec{u}_e, \vec{u}_r$) and of a pair of polarizations ($\pi_e, \pi_r$) having been the subject of a measurement, the RCS $\tilde{\sigma}_{ij}^{\pi_e \pi_r}$ will be better than the one which would have been directly obtained from the measurement. This is due to the noise filtration by projection on the space $E^s$ explained earlier.

Finally, it is possible to further obtain a better estimation of RCS than the one given by the diffraction model initially.

Indeed, the model approximately gives the eigenaxes of the RCS and the measurements allow accurate estimation of the modal values on the relevant axes.

The accuracy with which the modal values may be estimated and therefore the RCS, depends for a major part on the conditioning of the matrix $V^\mu$ in (14). It is recalled that the conditioning number of an inversible square matrix $\Omega$ is given by:

$$\text{cond}(\Omega) = \|\Omega^{-1}\| \cdot \|\Omega\| \qquad (16)$$

wherein the Euclidean norm is noted as $\|\cdot\|$.

Poor conditioning of the matrix $V^\mu$ may be either due to a too high number of selected modes s, the vectors $v_k$, $k \in S$ being then quasi linearly bound, or to an insufficient number of measurements $N^\mu$.

According to a first alternative embodiment, in the case of poor conditioning of the matrix, the number of selected modes, i.e. the number of column vectors of the matrix $V^\mu$ is first of all reduced. The modes containing the less energy are preferably removed, if necessary in an iterative way, until:

$$\text{cond}(V^{\mu H} V^\mu) < \text{cond}_T, \qquad (17)$$

wherein $\text{cond}_T$ is a predetermined threshold value. A subset of modes $S' \subset S$ and a vector $\lambda^\mu$ for which the components are decimated are thereby obtained. For the missing modes, i.e. those of S−S', they are completed with the modal values stemming from the model. More specifically, in (15) instead of the vector $\lambda^\mu$, a vector $\lambda_{rec}^\mu$ is then used, the components of which are:

$$\lambda_{rec\ k}^\mu = \lambda_k^\mu \text{ if } k \in S'$$

$$\lambda_{rec\ k}^\mu = \lambda_k^s \text{ if } k \in S-S' \qquad (18)$$

According to a second alternative embodiment, the number $N^\mu$ of measurements, in other words the size of the vector $a^\mu$, and correlatively the number of lines of $V^\mu$ are increased. This number may be increased by resorting to simulation data. It is possible to proceed by sequential increase, datum by datum, or else data block by data block, until a conditioning number is obtained below the threshold value $\text{cond}_T$. Alternatively, if several simulation data are available, $a^\mu$ will be augmented in turn with each of these data (by correlatively adding a line to $V^\mu$) and the conditioning numbers which result therefrom will be compared. The simulation datum leading to the smallest conditioning number will be retained. This method for increasing the conditioning by selectively augmenting the vector $a^\mu$ may also be iterated.

Similarly, according to a third alternative, $a^\mu$ may be augmented from additional measurements by selecting if necessary the measurements according to their impact on the conditioning. Indeed, among the $4N^2 - N^\mu$ possible additional measurements, the one(s) which will minimize the conditioning number may be retained. To do this, the matrix $V^\mu$ is completed in turn by the line of $V^s$ corresponding to the measurement to be added (pair of polarizations $(\pi_e, \pi_r)$ and pair of directions $(\vec{u}_e, \vec{u}_r)$) and the corresponding conditioning number is calculated. The one which achieves the smallest conditioning number is therefore determined which gives a preferred pair of directions $(\vec{u}_e^f, \vec{u}_r^f)$ and a preferred pair of polarizations $(\pi_e^f, \pi_r^f)$. The additional measurement is then carried out according to these preferred conditions and the vector $a^\mu$ is augmented by the new measurement. The conditioning numbers may also be sorted and the pairs of polarizations $(\pi_e, \pi_r)$ and of directions $(\vec{u}_e, \vec{u}_r)$ producing the $\Delta N^\mu$ smallest conditioning numbers, where $\Delta N^\mu$ is a predetermined integer, may be selected. The $\Delta N^\mu$ additional measurements are then carried out according to the preferred conditions and the vector $a^\mu$ is augmented by these $\Delta N^\mu$ new measurements.

According to a fourth alternative embodiment, the methods for improving conditioning according to the first alternative and the second alternative may be combined. For example, one may first attempt to improve conditioning by reducing the number of calculated modes (first alternative) and then, if the criterion (17) would not be met by increasing the number of measurements (second alternative). According to another exemplary combination, it is possible to alternatively eliminate a calculated mode and to add a simulation datum until the criterion (17) is met. Preferably, the minimum number s of calculated modes, $s_{min}$, and the maximum number of simulation data which may be injected, $\delta N_{max}^\mu$, will be set beforehand.

Figure 1:
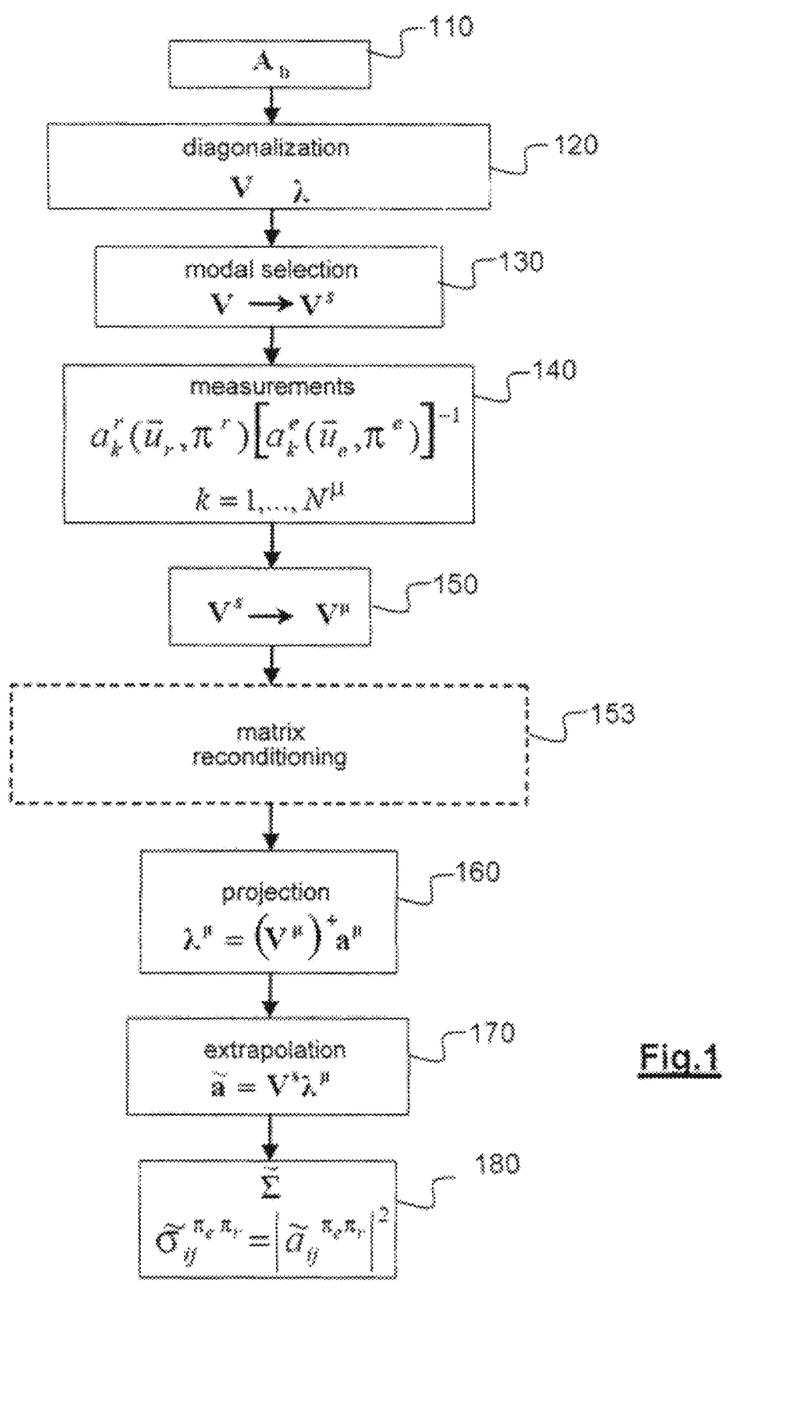
FIG. 1 illustrates the flowchart of a method for estimating RCS according to an embodiment of the invention.

FIG. 1 schematically illustrates the method for estimating RCS according to a first embodiment of the invention.

The method at 110 starts with a pre-existing diffraction model of the object for which estimation of the RCS is desired. This model is defined by a diffraction matrix $A_b$ for a plurality of pairs of incident waves and diffracted waves as well as for a plurality of polarizations.

In step 120, it is proceeded with modal decomposition, for example with diagonalization of $A_b$. The matrix of the eigenvectors V and the vector of eigenvalues $\lambda$, are obtained. Alternatively, by a decomposition into singular values, the matrix of singular vectors and the vector of singular values would be obtained.

In step 130, the set S of the most significant modes is determined, for example by the criterion (10) or (11), and the matrix V is reduced by suppression of columns in the matrix $V^s$ in which only the S modes are retained.

In step 140, $N^\mu >$ Card(S) measurements of complex amplitudes of an incident wave $a_k^e(\vec{u}_e, \pi^e)$ and of a diffracted wave $a_k^r(\vec{u}_r, \pi^r)$, are conducted in order to obtain the $N^\mu$ complex ratios $a_k^r(\vec{u}_r, \pi^r)[a_k^e, (\vec{u}_e, \pi^e)]^{-1}$ giving the components of $a^\mu$.

In step 150, the $4N^2 - N^\mu$ lines which are not concerned by the measurement are removed from $V^s$ in order to obtain $V^\mu$.

In 160, the vector $a^\mu$ is projected on the space $E^s$, i.e. $\lambda^\mu = (V^\mu)^+ a^\mu$ and in 170 the filtered and extrapolated vector $\tilde{a} = V^s \lambda^\mu$ is calculated.

In 180, the complete bistatic RCS $\tilde{\Sigma}$ is obtained from $\tilde{a}$: $\tilde{\sigma}_{ij}^{\pi_e \pi_r} = |\tilde{a}_{ij}^{\pi_e \pi_r}|^2$. It is also possible to make do with the calculation of certain elements of the matrix, for example those which give the monostatic RCS, or even only one for a desired pair of directions and a desired pair of polarizations.

The estimation method advantageously but not necessarily comprises a step for reconditioning the matrix $V^\mu$. This matrix reconditioning step is detailed in FIGS. 2-4.

Figure 2:
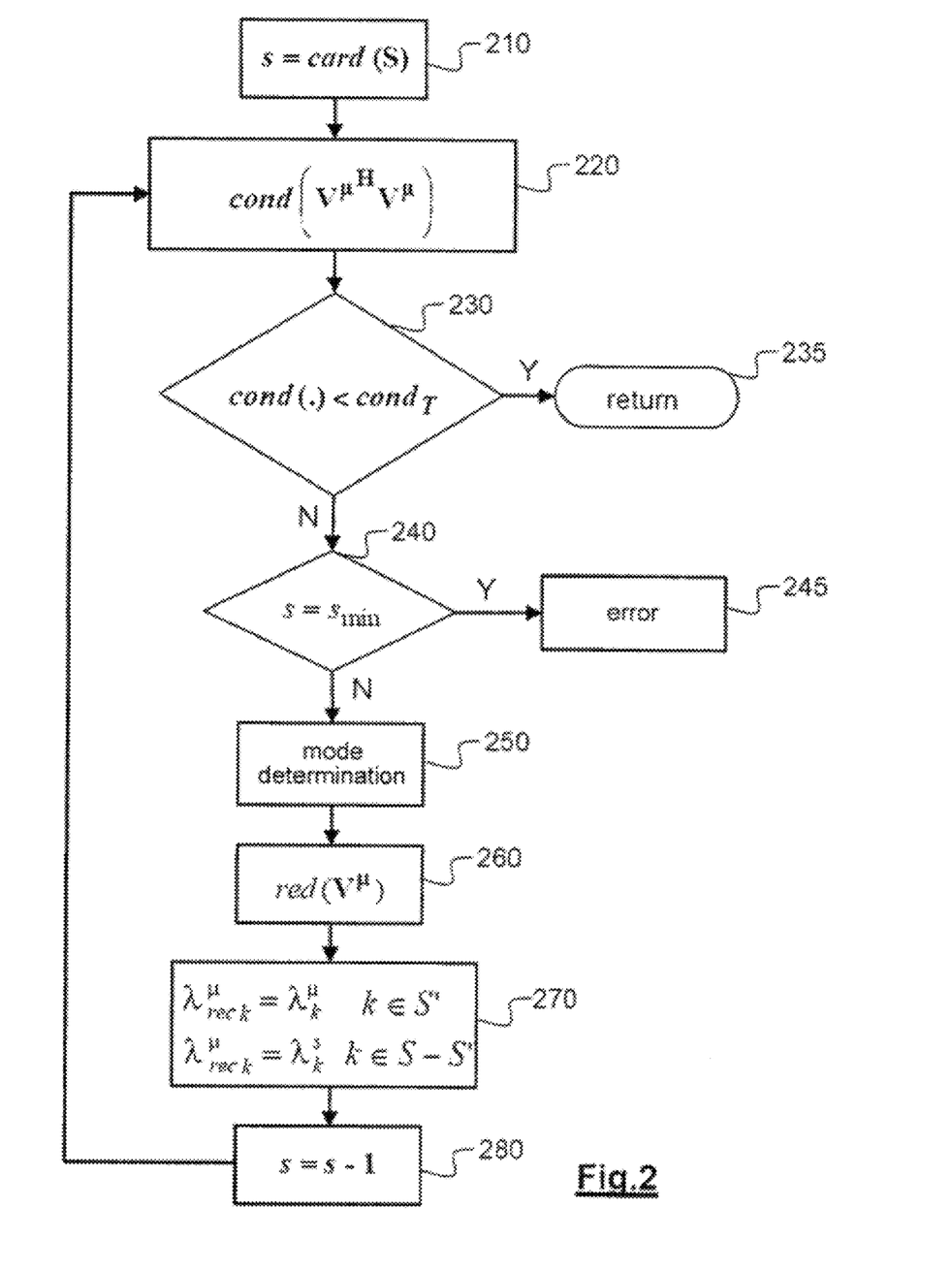
FIGS. 2-4 schematically represent alternatives of the matrix reconditioning method, useful for certain embodiments of the invention.

FIG. 2 illustrates a first alternative thereof.

In step 210, the counter of modes s is initialized to card(S).

In step 220, the conditioning number of the matrix $V^{82\ H} V^\mu$ is calculated and then it is tested in 230 whether this number is less than a threshold value $\text{cond}_T$. When yes, an exit is performed in 235.

On the other hand, if no, it is tested in 240 whether s is equal to the minimum number of calculated modes $s_{min}$.

If this is the case, termination is performed by returning an error message in 245. In the opposite case, the less significant mode is determined in 250, i.e. the component k of $\lambda^s$ with the smallest modulus.

In 260, the $k^{th}$ column vector corresponding to this component is removed from $V^\mu$.

In 270, the $k^{th}$ component is substituted with that of $\lambda^s$ in the vector $\lambda^\mu$, s is decremented in 280 and then return is performed to step 220.

Figure 3:
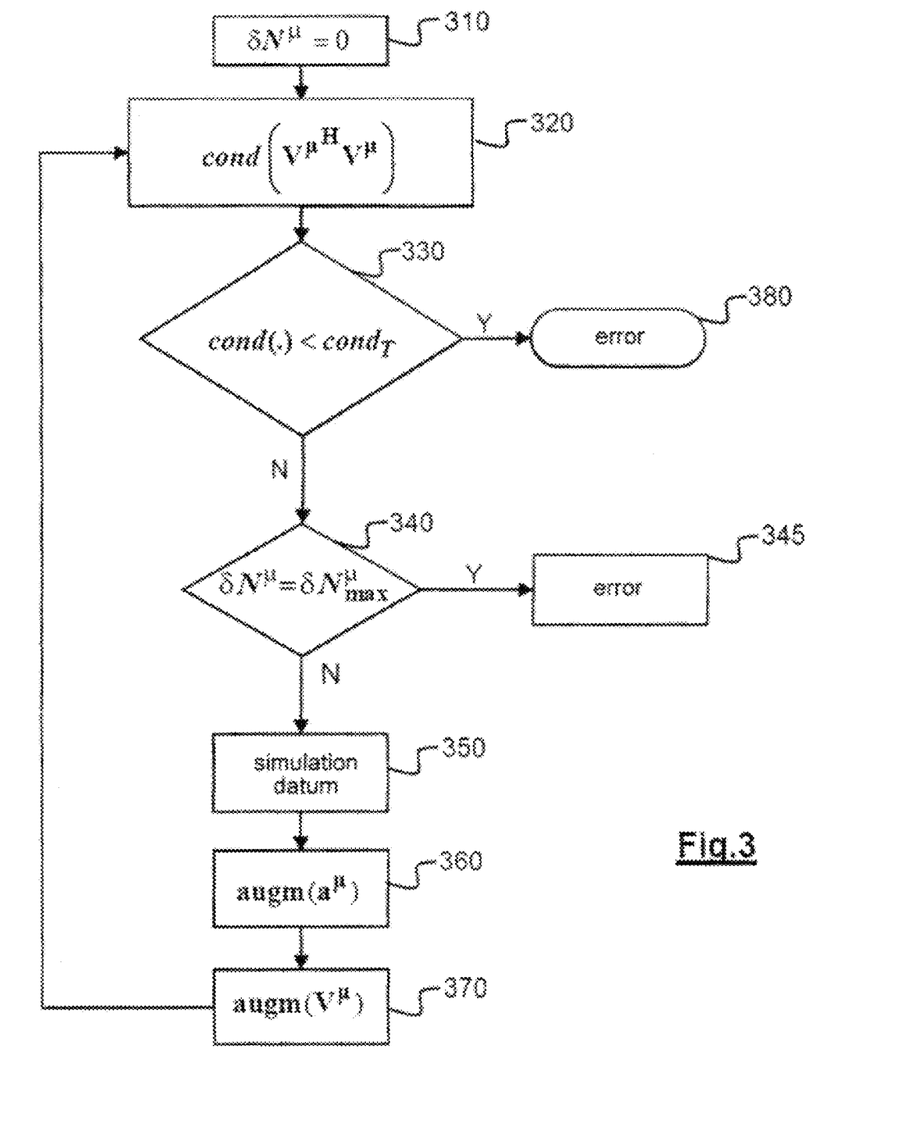

In FIG. 3 a second alternative of the matrix reconditioning method is illustrated.

In step 310, the simulation data counter, $\delta N^\mu$ is reset to zero.

In step 320, the conditioning number of the matrix $V^{\mu H}V^\mu$ is calculated and then it is tested in 330 whether this number is less than a threshold value $cond_T$. If yes, an exit is performed in 380.

On the other hand, if no, it is tested in 340 whether $\delta N^\mu$ is equal to the maximum number of simulation data $\delta N_{max}^\mu$.

If this is the case, termination is performed by returning an error message in 345. In the opposite case, an available simulation datum is selected in 350.

In 360, an additional component equal to the simulation datum is added to $a^\mu$ and $V^\mu$ is then recalculated in 370.

Return is then performed to step 320 for calculating the new conditioning number.

It will be understood that the selection of the simulation datum may be made depending on the obtained conditioning gain. It will also be understood, as already discussed above, that matrix reconditioning according to the second alternative may follow matrix reconditioning according to the first alternative. Alternatively, one will resort in turn to either one of them.

Figure 4:
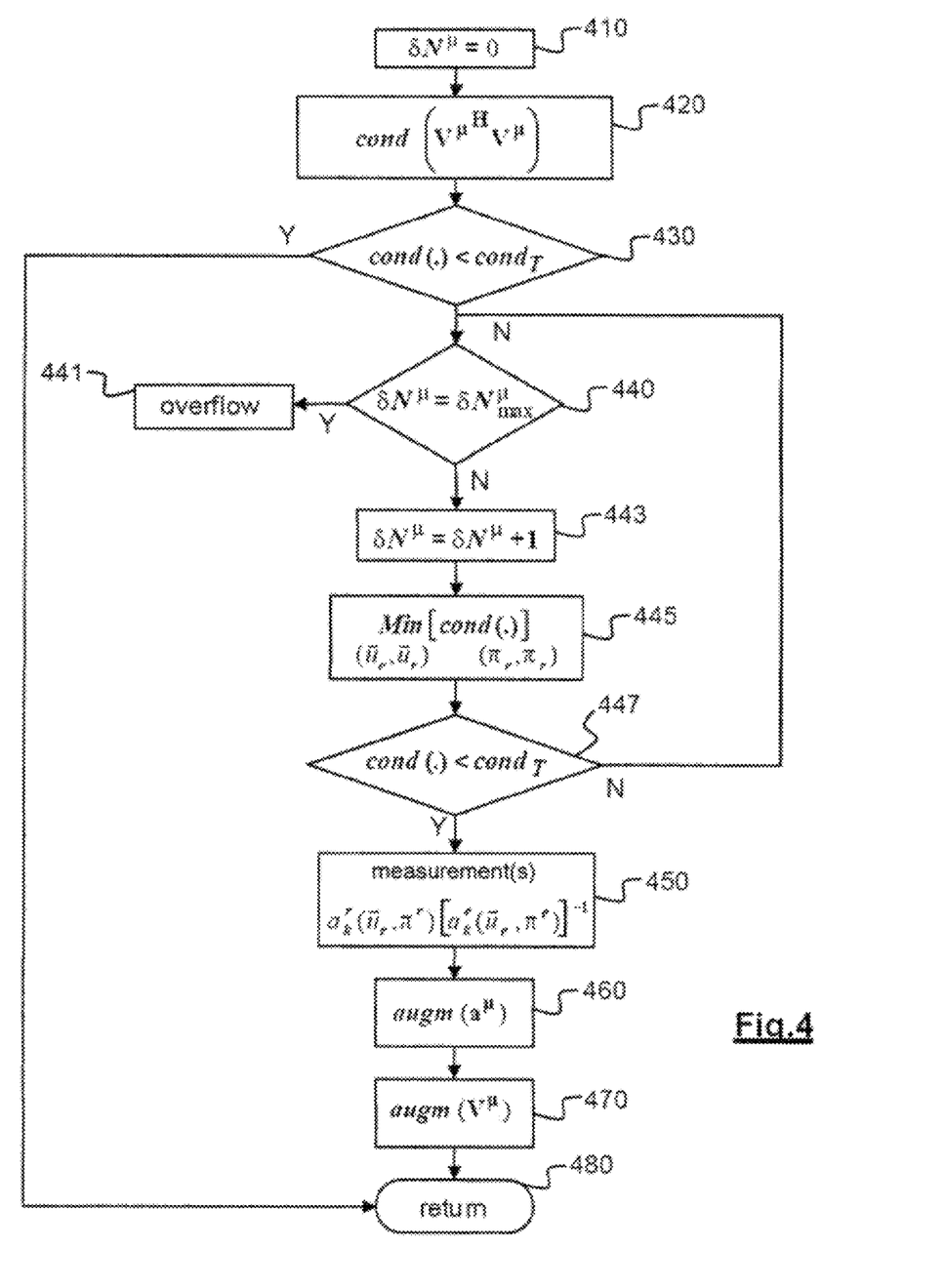

FIG. 4 illustrates a third alternative of the matrix reconditioning method.

In step 410, the counter of additional measurements $\delta N^\mu$ is reset to zero.

In step 420, the conditioning number of the matrix $V^{\mu H}V^\mu$ is calculated and it is then tested in 430 whether this number is less than a threshold value $cond_T$. If yes, an exit is performed in 480.

On the other hand, if no, it is tested whether one has reached a maximum number of additional measurements $\delta N_{max}^\mu$. If this is the case, an overflow message is returned in 441.

If no, $N^\mu$ and $\delta N^\mu$ are incremented in 443. In 445 from $V^s$ the one among the $4N^2-N^\mu$ combinations of possible directions ($\vec{u}_e, \vec{u}_r$) and polarizations ($\pi_e, \pi_r$), is determined which is able to minimize the conditioning number.

The steps 443 and 445 are repeated as long as the conditioning number is larger than the threshold value $cond_T$, as tested in 447.

In 450 the additional measurement(s) are carried out under the aforementioned conditions and the complex ratio(s) $a_k^r(\vec{u}_e, \pi^r)[a_k^e(\vec{u}_e, \pi^e)]^{-1}$ are calculated.

In 450 the additional component(s) equal to this (these) complex ratio(s) is/are added to $a^\mu$, and in 460, the corresponding line(s) to $V^\mu$. The matrix reconditioning method is terminated in 480.

Figure 5A:
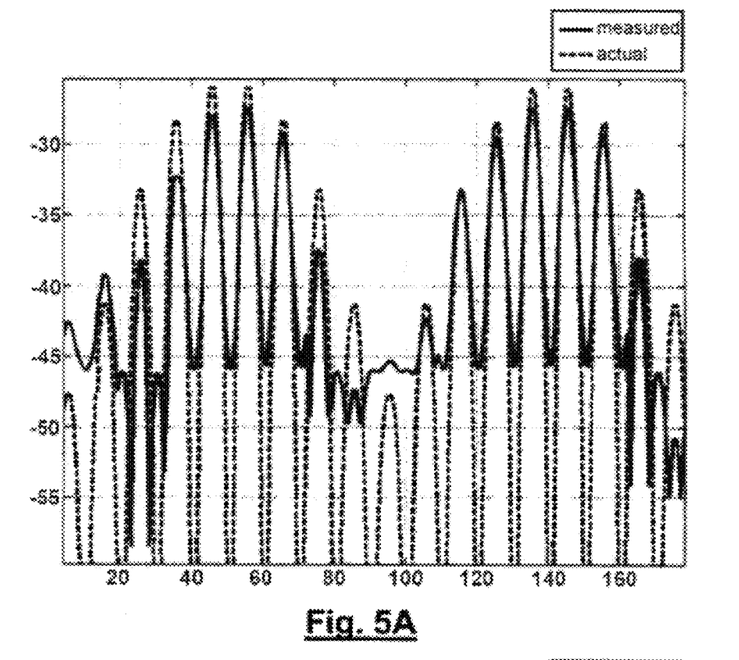
FIGS. 5A and 5B represent the actual RCS and the measured RCS of a given target according to two pairs of polarization upon emission and reception.
Figure 5B:
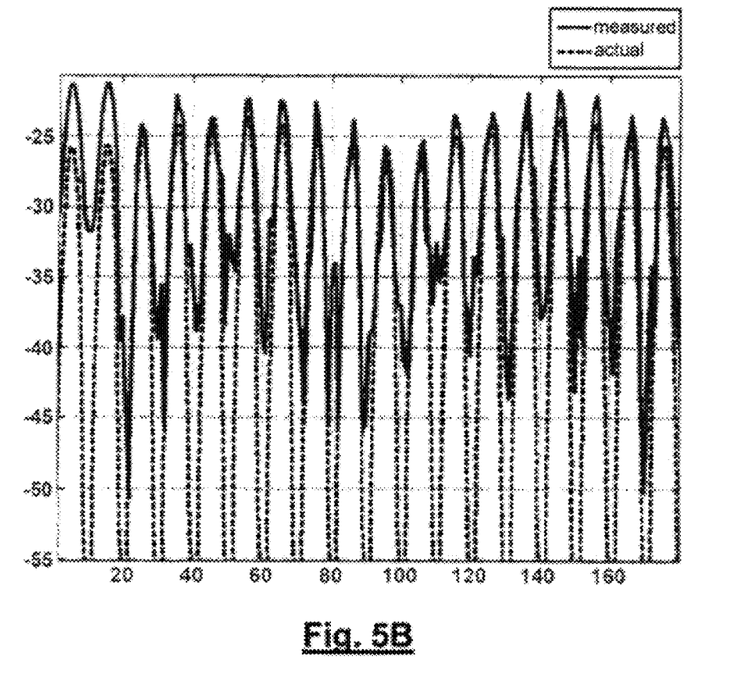

FIGS. 5A and 5B illustrate in broken lines the actual RCS of an given object for vertical, respectively horizontal polarizations $\pi^e$ and $\pi^r$. The directions of ($\vec{u}_i^e, \vec{u}_j^r$) are identical (monostatic RES) in the horizontal plane.

The angle $\theta=\theta_e=\theta_r$, appears in abscissae and the effective surface area in dB relatively to an arbitrary reference area appears in ordinates.

The RCS measured in a conventional way, i.e. simply on the basis of complex measurements $a_k^r/a_k^e$, also appears in broken lines.

Figure 6A:
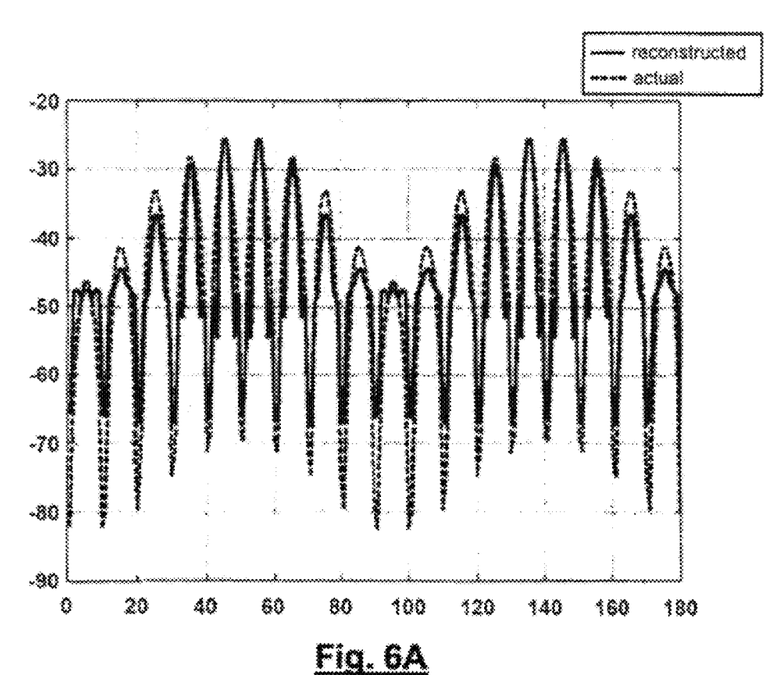
FIGS. 6A and 6B represent under the same conditions, the actual RCS and the estimated RCS according to the estimation method of the invention.
Figure 6B:
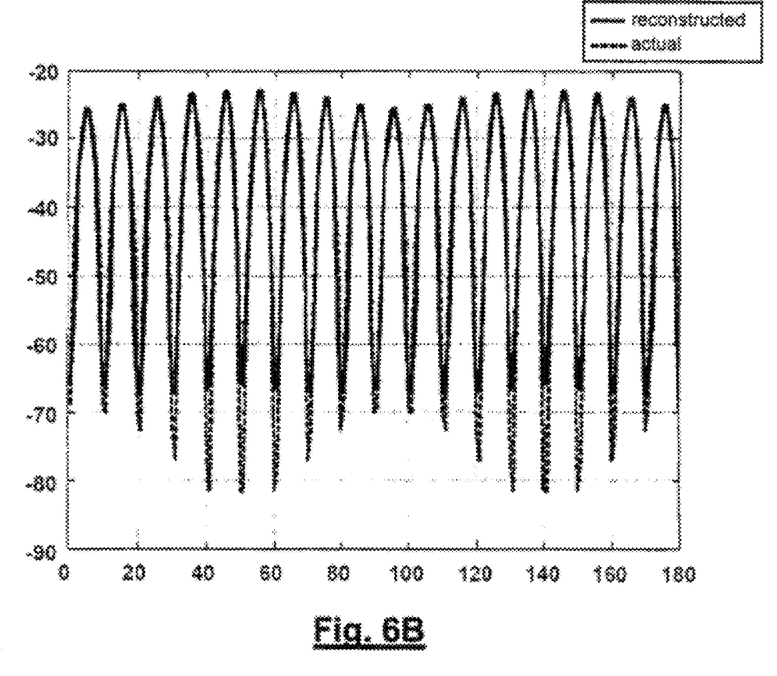

FIGS. 6A and 6B represent under the same conditions in broken lines the actual RCS and in solid lines, the RCS estimated according to the estimation method of the invention on the basis of a diffraction model and the aforementioned measurements.

It is noted that the estimation according to the method of the invention improves the signal-to-noise ratio of the RCS as compared with the conventional estimation and that it moreover allows very good extrapolation of RCS outside the measured points.

The invention claimed is:

1. A method for measuring the radar cross-section of a given object from a diffraction model of said object, said model being able to be represented by a matrix ($A_b$) of ratios of diffracted wave and incident wave complex amplitude, for a first plurality ($4N^2$) of pairs of respective incident wave and diffracted wave observation directions and polarizations, characterized in that:

a modal decomposition of said matrix is carried out and the most significant modal vectors of said thereby diagonalized matrix are then selected;

complex amplitudes of an incident wave and an object diffracted wave are measured for a plurality of pairs of directions and at least one pair of respective incident wave and diffracted wave observation polarizations;

a second plurality ($N^\mu$) of ratios of said measured diffracted wave and incident wave complex amplitudes are calculated;

the vector ($a^\mu$) formed by the thereby measured ratios is projected on said most significant modal vectors;

from the thereby projected vector and from the most significant modal vectors, a reconstructed vector ($\hat{a}$) is generated, the components of which are representative of the ratios of incident and diffracted wave complex amplitudes for said first plurality of pairs of directions and of polarizations; and a measurement of said radar cross-section is obtained from at least one component of the reconstructed vector.

2. The radar cross-section measuring method according to claim 1, characterized in that said modal decomposition is a diagonalization and the modal vectors and modal values are the eigenvectors and the eigenvalues of said matrix, respectively.

3. The radar cross-section measuring method according to claim 1, characterized in that said modal decomposition is a decomposition into singular values and the modal vectors and modal values are the singular vectors and the singular values of said matrix, respectively.

4. The radar cross-section measuring method according to claim 1, characterized in that a modal vector $v_{k'}$ is selected as being part of the most significant if:

$$\frac{\lambda_{k'}^2 \|v_{k'}\|^2}{\left\|\sum_{k=1}^{2N} \lambda_k v_k\right\|^2} > \tau_1$$

wherein $\lambda_k$, $v_k$, $k=1, \ldots, 2N$, are the modal values and the modal vectors of the matrix of the model respectively, 2N is the number of columns of this matrix and $\tau_1$ is a predetermined threshold value.

5. The radar cross-section measuring method according to claim 1, characterized in that a modal vector $v_{k'}$ is selected as being part of the most significant if:

$$\frac{\left\|\sum_{\substack{k=1\\k\neq k'}}^{2N} \lambda_k v_k\right\|^2}{\left\|\sum_{k=1}^{2N} \lambda_k v_k\right\|^2} < \tau_2$$

wherein $\lambda_k$, $v_k$, k=1, ..., 2N are the modal values and the modal vectors of the matrix of the model, respectively, 2N is the number of columns of the matrix, and $\tau_2$ is a predetermined threshold value.

6. The radar cross-section measuring method according to claim 1, characterized in that the projection of the vector formed by the thereby measured ratios $a^\mu$, is determined by:

$$\lambda^\mu = (V^\mu)^+ a^\mu$$

wherein $\lambda^\mu$ represents the vector of the components of $a^\mu$ on the most significant modal vectors, $(V^\mu)^+$ is the pseudo-inverse matrix of $V^\mu$, $V^\mu$ is the matrix, whereof the columns are said most significant modal vectors and the lines correspond to the second plurality of measured ratios.

7. The radar cross-section measuring method according to claim 6, characterized in that the reconstructed vector $\tilde{a}$ is generated by:

$$\tilde{a} = V^s \lambda^\mu$$

wherein $V^s$ is the matrix, whereof the columns are said most significant modal vectors and the lines correspond to the first plurality of ratios of the model.

8. The radar cross-section measuring method according to claim 7, characterized in that the radar cross-section ($\sigma_{ij}^{\pi_e \pi_r}$) for a pair of incident wave and diffracted wave observation directions and a pair of associated polarizations is obtained from the squared module ($|\tilde{a}_{ij}^{\pi_e \pi_r}|^2$) of a component of said reconstructed vector.

9. The radar cross-section measuring method according to claim 6, characterized in that the pseudo-inverse matrix is obtained by $(V^\mu)^+ = (V^{\mu^H} V^\mu)^{-1} V^{\mu^H}$ and the matrix $V^\mu$ is first subject to matrix reconditioning if the conditioning number of the matrix $V^{\mu^H} V^\mu$ is larger than a predetermined threshold ($\text{cond}_T$).

10. The radar cross-section measuring method according to claim 9, characterized in that the matrix reconditioning of $V^\mu$ comprises steps for removing at least one column vector of $V^\mu$ corresponding to the least significant mode, and of substituting the corresponding component of $\lambda^\mu$ with the corresponding modal value.

11. The radar cross-section measuring method according to claim 10, characterized in that said matrix reconditioning steps are iterated as long as the number of modes(s) remains larger than a predetermined minimum number of modes.

12. The radar cross-section measuring method according to claim 10, characterized in that said matrix reconditioning steps are iterated as long as the number of introduced simulation data remains less than a predetermined maximum number ($\delta N_{max}$).

13. The radar cross-section measuring method according to claim 9, characterized in that the matrix reconditioning of $V^\mu$ comprises steps for augmenting the vector formed with the measured ratios by at least one simulation datum for a pair of incident wave and diffracted wave observation directions ($\vec{u}_e, \vec{u}_r$) and for a pair of associated polarizations ($\pi_e, \pi_r$) and for augmenting the matrix $V^\mu$ by the corresponding line of $V^s$.

14. The radar cross-section measuring method according to claim 9, characterized in that the matrix reconditioning of $V^\mu$ comprises steps for augmenting the vector formed with the measured ratios by at least one additional measurement for a pair of incident wave and diffracted wave observation directions ($\vec{u}_e, \vec{u}_r$) and for a pair of associated polarizations ($\pi_e, \pi_r$) and for augmenting the matrix $V^\mu$ by the corresponding line of $V^s$.

15. The radar cross-section measuring method according to claim 14, characterized in that for the additional measurement, the pair of incident wave and diffracted wave observation directions ($\vec{u}_e, \vec{u}_r$) as well as the pair of associated polarizations ($\pi_e, \pi_r$) are selected in order to minimize the conditioning number of the matrix $V^{\mu^H} V^\mu$ after augmenting $V^\mu$.

16. A non-transitory computer readable storage medium containing executable instructions which cause a computer to perform a radar cross-section measuring method comprising:
  measuring the radar cross-section of a given object from a diffraction model of said object, said model being represented by a matrix ($A_b$) of ratios of diffracted wave and incident wave complex amplitude, for a first plurality ($4N^2$) of pairs of respective incident wave and diffracted wave observation directions and polarizations, characterized in that:
  a modal decomposition of said matrix is carried out and the most significant modal vectors of said thereby diagonalized matrix are then selected;
  complex amplitudes of an incident wave and an object diffracted wave are measured for a plurality of pairs of directions and at least one pair of respective incident wave and diffracted wave observation polarizations;
  a second plurality ($N^\mu$) of ratios of said measured diffracted wave and incident wave complex amplitudes are calculated;
  the vector ($a^\mu$) formed by the thereby measured ratios is projected on said most significant modal vectors;
  from the thereby projected vector and from the most significant modal vectors, a reconstructed vector ($\tilde{a}$) is generated, the components of which are representative of the ratios of incident and diffracted wave complex amplitudes for said first plurality of pairs of directions and of polarizations; and
  a measurement of said radar cross-section is obtained from at least one component of the reconstructed vector.

* * * * *